US012037017B2

(12) United States Patent
Li et al.

(10) Patent No.: US 12,037,017 B2
(45) Date of Patent: Jul. 16, 2024

(54) COLLISION EVALUATION USING A HIERARCHY OF GRIDS

(71) Applicant: WAYMO LLC, Mountain View, CA (US)

(72) Inventors: Dong Li, Los Gatos, CA (US); Tian Jin, San Francisco, CA (US); Mingxiang Fan, Cupertino, CA (US); Rajiv Kurian, Redwood City, CA (US)

(73) Assignee: Waymo LLC, Mountain View, CA (US)

(*) Notice: Subject to any disclaimer, the term of this patent is extended or adjusted under 35 U.S.C. 154(b) by 0 days.

(21) Appl. No.: 17/071,008

(22) Filed: Oct. 15, 2020

(65) Prior Publication Data

US 2022/0119011 A1  Apr. 21, 2022

(51) Int. Cl.
*B60W 60/00* (2020.01)
*G08G 1/16* (2006.01)

(52) U.S. Cl.
CPC .. *B60W 60/0016* (2020.02); *B60W 60/00272* (2020.02); *B60W 60/00276* (2020.02); *G08G 1/16* (2013.01); *B60W 2554/80* (2020.02)

(58) Field of Classification Search
CPC ....... B60W 60/0016; B60W 60/00272; B60W 60/00276; B60W 2554/80; G08G 1/16
See application file for complete search history.

(56) References Cited

U.S. PATENT DOCUMENTS

| | | | |
|---|---|---|---|
| 8,020,657 B2 | 9/2011 | Allard et al. | |
| 9,720,415 B2 | 8/2017 | Levinson et al. | |
| 11,640,764 B1* | 5/2023 | Alonso Lopez | G08G 5/0086 701/7 |
| 2011/0106361 A1* | 5/2011 | Staempfle | B60W 50/14 701/23 |
| 2015/0046078 A1* | 2/2015 | Biess | G08G 1/163 701/301 |
| 2017/0083021 A1* | 3/2017 | Balaghiasefi | G05D 1/0274 |
| 2017/0247036 A1* | 8/2017 | Halder | G06V 20/56 |
| 2019/0163191 A1 | 5/2019 | Sorin et al. | |
| 2020/0082248 A1* | 3/2020 | Villegas | G06N 3/08 |

(Continued)

OTHER PUBLICATIONS

Das, Soumyo, A system for grid-based merge cut-in prediction and method thereof, Apr. 2, 2020, English machine translation of : WO 2020/065416 A1 (Year: 2020).*

(Continued)

*Primary Examiner* — James J Lee
*Assistant Examiner* — Steven Vu Nguyen
(74) *Attorney, Agent, or Firm* — Botos Churchill IP Law

(57) ABSTRACT

Aspects of the disclosure provide for evaluation of a planned trajectory for an autonomous vehicle. For instance, for each of a plurality of objects, a predicted trajectory may be received. The planned trajectory may identify locations and times that the vehicle will be at those locations. For each of the plurality of objects, a grid including a plurality of cells may be generated. Occupancy of each grid for each of the plurality of objects may be determined based on the predicted trajectories. A cell of each grid which will be occupied by the vehicle at a location and time of the planned trajectory may be identified. The planned trajectory may be evaluated based on whether any identified cell is occupied by any of the plurality of objects at the time.

20 Claims, 11 Drawing Sheets

(56) References Cited

U.S. PATENT DOCUMENTS

| | | | | |
|---|---|---|---|---|
| 2020/0307568 | A1* | 10/2020 | Takahashi | B60R 11/04 |
| 2021/0004012 | A1* | 1/2021 | Marchetti-Bowick | G05D 1/0088 |
| 2021/0096566 | A1* | 4/2021 | Wang | B60W 30/0953 |
| 2021/0380099 | A1* | 12/2021 | Lee | G08G 1/0141 |

OTHER PUBLICATIONS

Fulgenzi, et al., Dynamic Obstacle Avoidance in uncertain environment combining PVOs and Occupancy Grid., Proc. of the IEEE Int. Conf. on Robotics and Automation, Apr. 2007, Rome, France.

* cited by examiner

COLLISION EVALUATION USING A HIERARCHY OF GRIDS

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

When a person (or user) wants to be physically transported between two locations via a vehicle, they may use any number of taxi services. To date, these services typically involve a human driver who is given dispatch instructions to a location to pick up and drop off the user. In addition, human drivers are able to communicate with the use of physical gestures (hand, head, facial), a phone call, or an in-person discussion between the driver and the passenger. Autonomous vehicles, however, may not always have a human driver who can make such communications.

BRIEF SUMMARY

Aspects of the disclosure provide a method of evaluating a planned trajectory for an autonomous vehicle, the planned trajectory identifying locations and times that the vehicle will be at those locations. The method includes receiving, by one or more processors, for each of a plurality of objects, a predicted trajectory; generating, by the one or more processors, a set of one or more grids, each grid of the set of grids including a plurality of cells, and where a size of each cell for a given grid of the set of one or more grids is determined based on the size of any objects of the plurality of objects associated with the given grid; determining, by the one or more processors, occupancy of each grid of the set of grids, based on the predicted trajectories; identifying, by the one or more processors, a cell of each grid of the set which will be occupied by the vehicle at a location and time of the planned trajectory; and evaluating, by the one or more processors, the planned trajectory based on whether any identified cell is occupied by any of the plurality of objects at the time.

In one example, the size of each cell for a given grid of the set of one or more grids is determined further based on a size of the vehicle. In this example, determining the size includes increasing the size until an object of the plurality of objects will fit into a cell of the increased size. In addition, determining the size includes increasing the size until the object can occupy no more than four cells of the increased size. In another example, each grid of the set of grids covers a same geographic area. In another example, generating each grid for each of the plurality of objects includes determining dimensions for all of the grids. In this example, the dimensions are a predetermined size. In another example, generating of the set of one or more grids includes generating of the set of one or more grids for a first portion of the vehicle, and identifying the cell of each grid for the plurality of objects which will be occupied by the vehicle includes identifying the cell of each grid of the set of one or more grids that is occupied by the first portion. In this example, the method also includes generating, for a second portion of the vehicle and each of the plurality of objects, a second set of grids, each grid of the second set of grids including a second plurality of cells; determining occupancy of each second grid of the second set of grids, based on the predicted trajectory; identifying a second cell of each grid of the second set of grids which will be occupied by the second portion of the vehicle at a location and time of the planned trajectory; and evaluating the planned trajectory based on whether the identified second cells are occupied by any of the plurality of objects at the time. In another example, the method also includes determining occupancy of each grid for each of the plurality of objects further includes associating occupancy of 8 cells surrounding a particular cell within that particular cell such that collisions can be evaluated for 9 cells at once. In another example, the method also includes, based on the evaluation of the planned trajectory, using the planned trajectory to control the vehicle in an autonomous driving mode. In another example, the method also includes, based on the evaluation of the planned trajectory, discarding the planned trajectory. In this example, the method also includes, based on the evaluation of the planned trajectory, generating a new planned trajectory.

Another aspect of the disclosure provides a system for evaluating a planned trajectory for an autonomous vehicle. The planned trajectory identifies locations and times that the vehicle will be at those locations. The system includes one or more processors configured to: receive for each of a plurality of objects, a predicted trajectory; generate for each of the plurality of objects, a set of one or more grids, each grid of the set of one or more grids including a plurality of cells, and where a size of each cell for a given grid of the set of one or more grids is determined based on the size of any objects of the plurality of objects associated with the given grid; determine occupancy of each grid of the set of grids for each of the plurality of objects, based on the predicted trajectories; identify a cell of each grid of the set of grids which will be occupied by the vehicle at a location and time of the planned trajectory; and evaluate the planned trajectory based on whether any identified cell is occupied by any of the plurality of objects at the time.

In one example, the one or more processors are further configured to determine the size of each cell for the given grid further based on a size of the vehicle and by increasing the size until an object of the plurality of objects will fit into a cell of the increased size. In this example, determining the size further includes increasing the size until an object of the plurality of objects can occupy no more than four cells of the increased size. In another example, the one or more processors are further configured to generate the set of one or more grids by generating the grids the set of one or more grids for a first portion of the vehicle, and to identify the cell of each grid of the set of grids for the plurality of objects which will be occupied by the vehicle by identifying the cell of each grid of the set of grids that is occupied by the first portion, and the one or more processors are further configured to: generate, for a second portion of the vehicle, a second set of grids, each grid of the second set of grids including a second plurality of cells; determine occupancy of each grid of the second set of grids for each of the plurality of objects, based on the predicted trajectory; identify a second cell of each grid of the second set of grids which will be occupied by the second portion of the vehicle at a location and time of the planned trajectory; and evaluate the planned trajectory based on whether the identified second cells are occupied by any of the plurality of objects at the time. In another example, the one or more processors are further configured to determine occupancy of each grid of the set of one or more grids by associating occupancy of 8 cells surrounding a particular cell within that particular cell such that collisions can be evaluated for 9 cells at once. In another example, the one or more processors are further configured to, based on the evaluation of the planned trajectory, use the planned trajectory to control the vehicle in an autonomous driving mode. In another example, the one or more processors are further configured to, based on the evaluation of the planned trajectory, discard the planned trajectory. In this example, the one or more processors are further configured to, based on the evaluation of the planned trajectory, generate a new planned trajectory.

DETAILED DESCRIPTION

Overview

Figure 1:
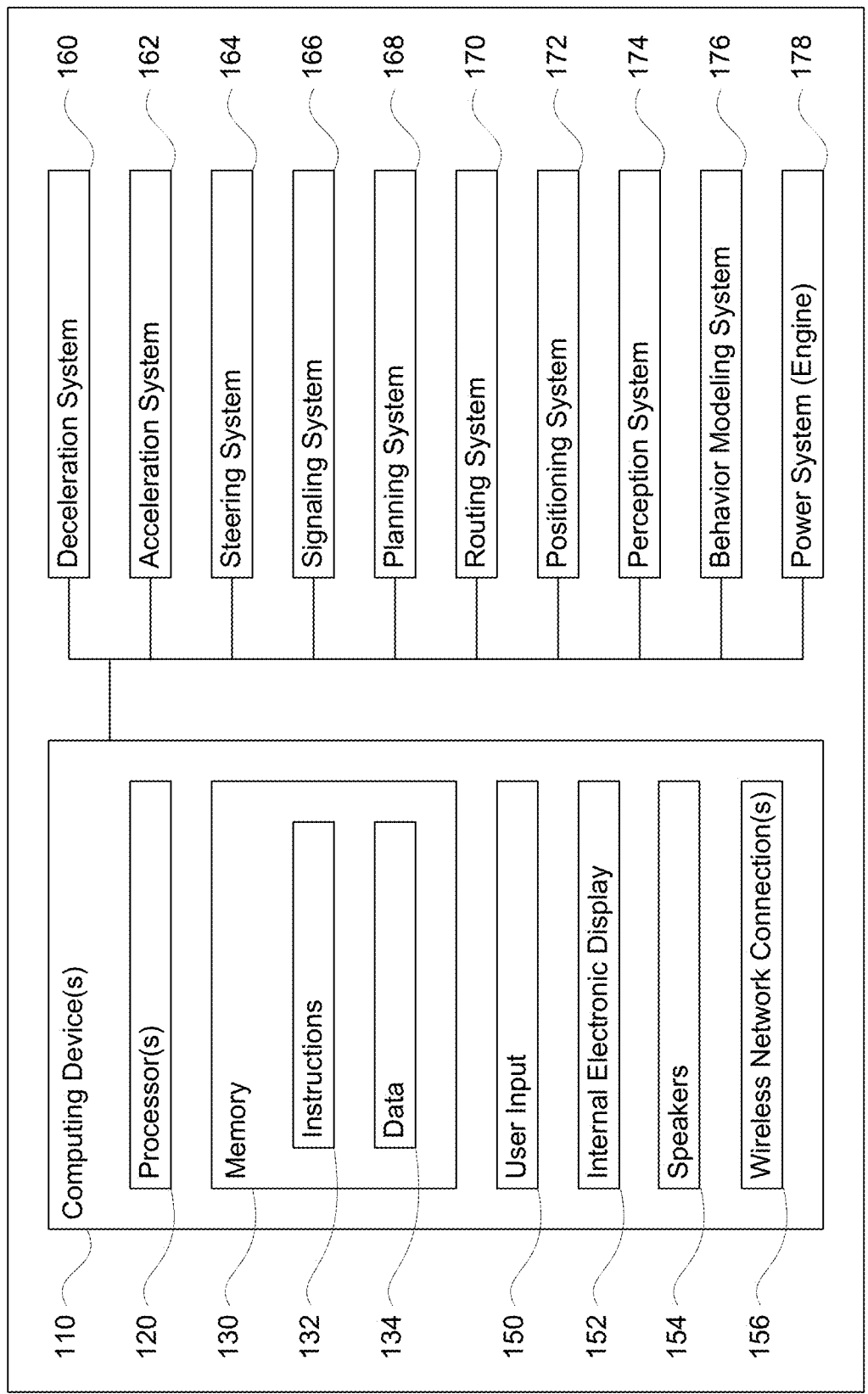
FIG. 1 is a functional diagram of an example vehicle in accordance with an exemplary embodiment.

The technology relates to an approach for checking for collisions with autonomous vehicles. This approach can be used to confirm that trajectories generated by a vehicle's planning system are unlikely to result in a collision with another object before publishing those planned trajectories. In this regard, the approach may be useful for validating planned trajectories before an autonomous vehicle takes action to follow those planned trajectories. Among other things, each planned trajectory may identify locations and times that the vehicle will be at those locations.

In order to perform the aforementioned collision evaluation for a planned trajectory, a set of grids may be generated. Each grid of the set of grids may be centered around the current location of the vehicle, and any object that falls within the grid bounds may be stored. The size of each grid of the set of grids may be determined based on how far the vehicle is likely to travel during the planned trajectory with some additional buffer area.

The size of the cells of each given grid of the set of grids may be determined based on the size of any objects associated with that given grid. For instance, the smallest size of the cells may be selected such that at any location in the grid, the vehicle would occupy no more than a predetermined number of cells, such as four cells, and the vehicle could fit into a single cell. In addition, different grids may be built using different cell sizes for different objects. For instance, given a large object, the size of cells around that object may increase exponentially until that object fits into a single cell and occupies no more than the predetermined number of cells.

Once each grid of the set is generated, the predicted trajectories (or behavior predictions) of any objects associated with each grids may be stored within that grid and indexed by time. For example, a behavior prediction system of the vehicle may use observations of an object from a perception system of the vehicle to generate behavior predictions or predicted trajectories for each object.

The grid for each object can then be evaluated to determine whether there might be a collision at different locations and corresponding times along a planned trajectory generated by the vehicle's planning system. For instance, given a vehicle's current or future position and time along a planned trajectory, a cell of each grid may be located that contain the vehicle's center. As described above, objects could also occupy at most four neighboring cells in any grid, and the size of the smallest cell is larger than the size of the vehicle, so the vehicle can at most occupy four cells in any grid. Therefore, the evaluation may involve checking for objects in the nine cells centered around the cell that contains the vehicle. To increase efficiency of the checking, the evaluation may involve simply determining whether any of the nine cells is occupied by an object.

This process may be repeated for all grids for the different objects and at different times for the planned trajectory. If the evaluation of any cell identifies that it is occupied by an object, the evaluation may result in a "collision" for the trajectory. As such, a planning system of the vehicle may attempt to generate a new planned trajectory and the process may repeat until a new planned trajectory without a collision is generated. Alternatively, the planning system may generate a plurality of possible planned trajectories (for example, tens of thousands or more or less), and the evaluation can be used to filter those planned trajectories to identify which is "best".

However, the aforementioned evaluation may require checking each of the nine cells individually for an object. To further improve efficiency, each object may be replicated in all neighboring cells. Thus, when the center of the vehicle is located in a particular cell, only the data stored within that particular cell would need to be evaluated. As such, the evaluation would involve determining if any of the eight cells surrounding the particular cell are occupied at a given point in time in one step, without requiring processing each of those nine cells individually.

The approach also allows for collision traceability. For example, because each object will have its own occupancy grid, the evaluation will automatically identify the object that is likely to cause the collision. This information can be fed back into the planning system to reduce the likelihood of the planning system generating a new planned trajectory that could cause a collision with that object.

The features described herein may allow for an efficient confirmation of planned trajectories for vehicles. In addition, the approach described herein may avoid computing geometry rasterization, quickly locate objects and predicted trajectories, adapt to objects of various sizes, reason about collision context, and easily add and remove objects and predicted trajectories. Moreover, the approach, and specifically using grids and duplicative storage, has shown itself to be significantly faster (up to five times) than other approaches which use more specific collision evaluations.

Thus, in situations in which only a fraction of a second can be spared for such calculations, the approach described herein is incredibly invaluable.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, 12ML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers to provide information to a passenger of the vehicle 100 as needed. For example, electronic display 152 may be located within a cabin of vehicle 100 and may be used by computing devices 110 to provide information to passengers within the vehicle 100. Electronic display 154 may be located on an exterior of the vehicle, such as mounted on the roof or at some other portion of the vehicle. Alternatively, the display 154 or in an interior location which allows persons outside of the vehicle to view information presented on the display 154, such as such as a display mounted at the center of a dashboard of the vehicle and oriented outwards. In some instances, the displays 152, 154 may be flat, curved, and may extend 360 degrees. As discussed in further detail below, the computing devices 110 in combination with display 152 and/or display 154 may be a notification system which can provide information to passengers as well as other persons outside of the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may function as an autonomous control system, and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 170, planning system 168, positioning system 172, and perception system 174 in order to control the movement, speed, etc. of vehicle 100 in accordance with the instructions 134 of memory 130 in the autonomous driving mode.

As an example, a computing device of the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system in order to signal the vehicle's intent to other drivers or vehicles, for example, by lighting turn signals or brake lights when needed.

Routing system 166 may be used by the computing devices 110 in order to generate a route to a destination. Planning system 168 may be used by computing device 110 in order to follow the route. In this regard, the planning system 168 and/or routing system 170 may store detailed map information, e.g., highly detailed maps identifying a road network including the shape and elevation of roadways, lane lines, intersections, crosswalks, speed limits, traffic signals, buildings, signs, real time traffic information, pull-over spots, vegetation, or other such objects and information.

Figure 2:
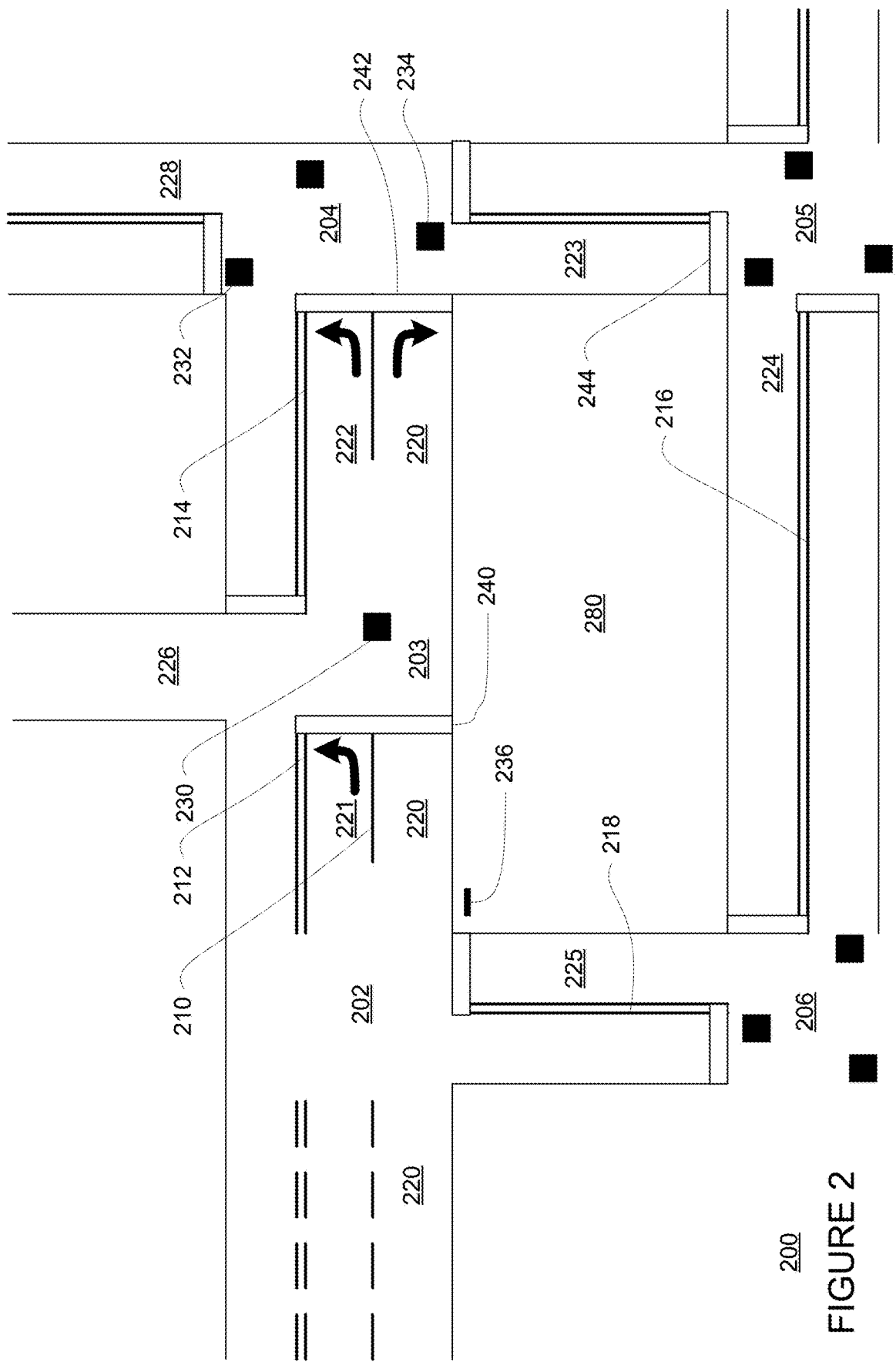
FIG. 2 is an example of map information in accordance with aspects of the disclosure.

FIG. 2 is an example of map information 200 for a small section of roadway including intersections 202, 203, 204, 205, 206. FIG. 2 depicts a portion of the map information 200 that includes information identifying the shape, location, and other characteristics of lane markers or lane lines 210, 212, 214, 216, 218, lanes 220, 221, 222, 223, 224, 225, 226, 228, traffic control devices including traffic signal lights 230, 232, 234 and stop sign 236, stop lines 240, 242, 244, as well as a non-drivable area 280. In this example, lane 221 approaching intersection 204 is a left turn only lane, lane 222 approaching intersection 206 is a left turn only lane, and lane 226 is a one-way street where the direction of traffic moves away from intersection 204. In addition to the aforementioned features, the map information may also include information that identifies the direction of traffic for each lane as well as information that allows the computing devices 110 to determine whether the vehicle has the right of way to complete a particular maneuver (i.e. complete a turn or cross a lane of traffic or intersection).

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

The routing system 170 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 172 may also include other devices in communication with the computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
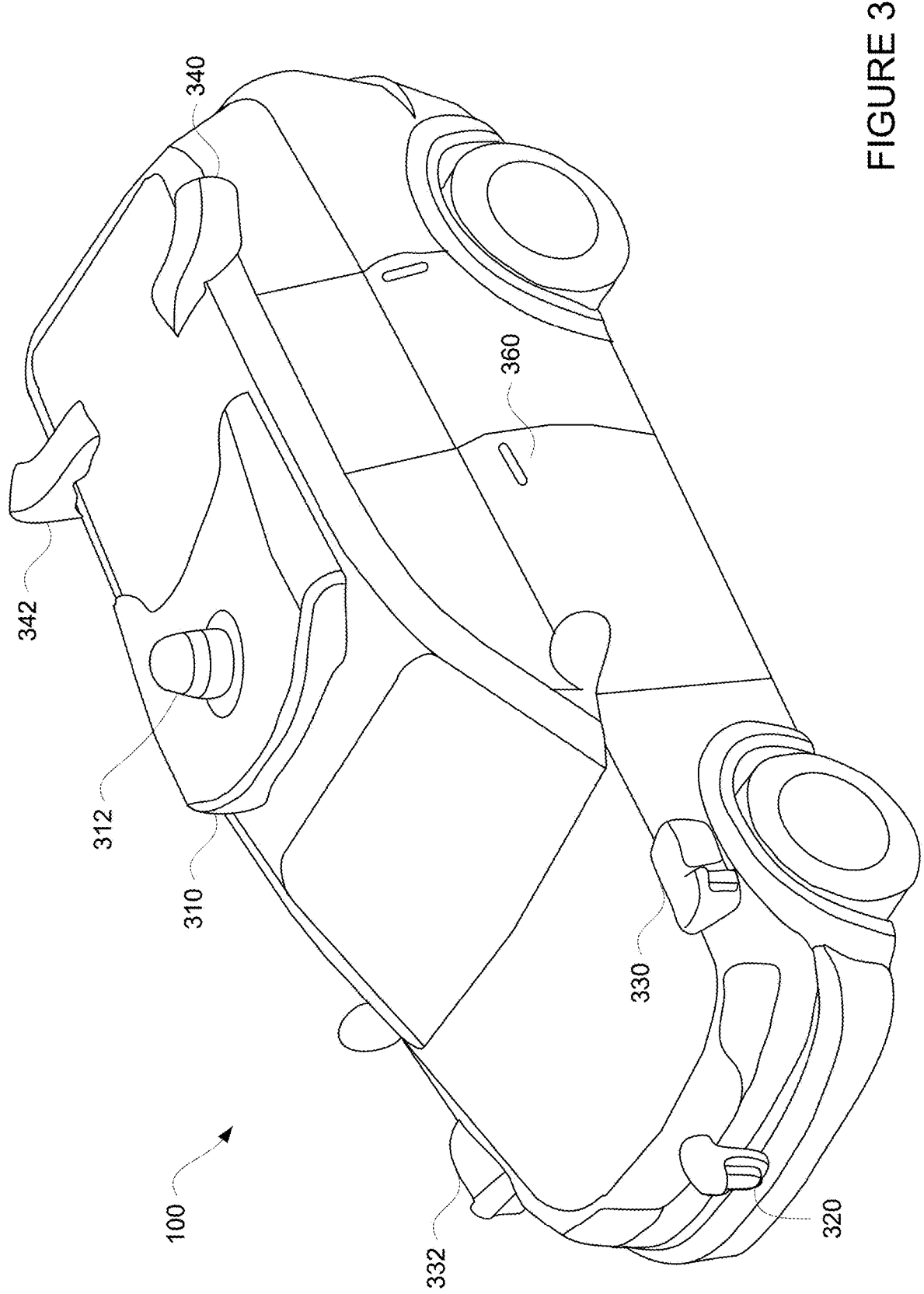
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 170, planning system 168, positioning system 172, perception system 174, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of a behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 170. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 172 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
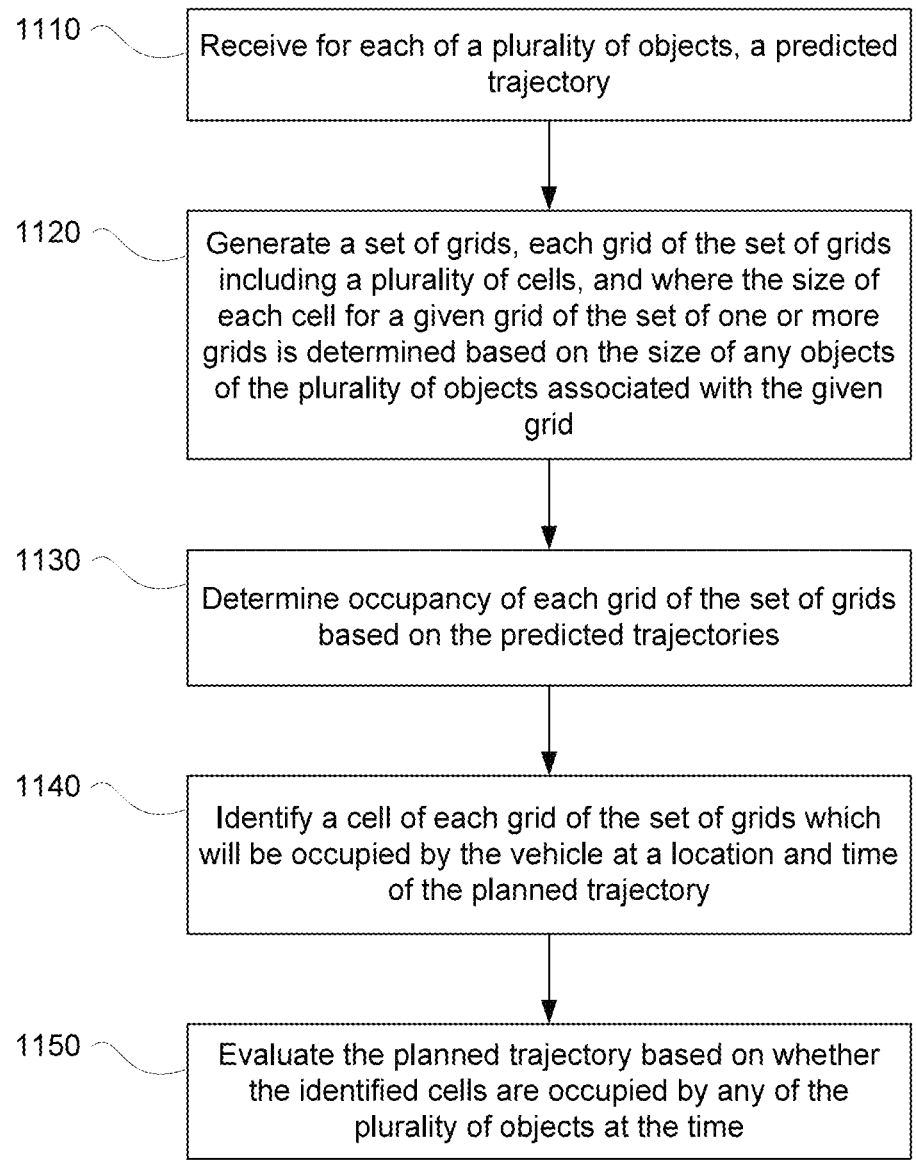
FIG. 11 is an example flow diagram in accordance with an aspect of the disclosure.

FIG. 11 is an example flow diagram 1100 for evaluating a planned trajectory for an autonomous vehicle which may be performed by one or more processors of one or more computing devices such as the processors 120 of the computing devices 110, the planning system 168, and/or another system of the vehicle 100. The planned trajectory identifies locations and times when the vehicle will be at those locations. At block 1110, a predicted trajectory for each of a plurality of objects is received.

Figure 4:
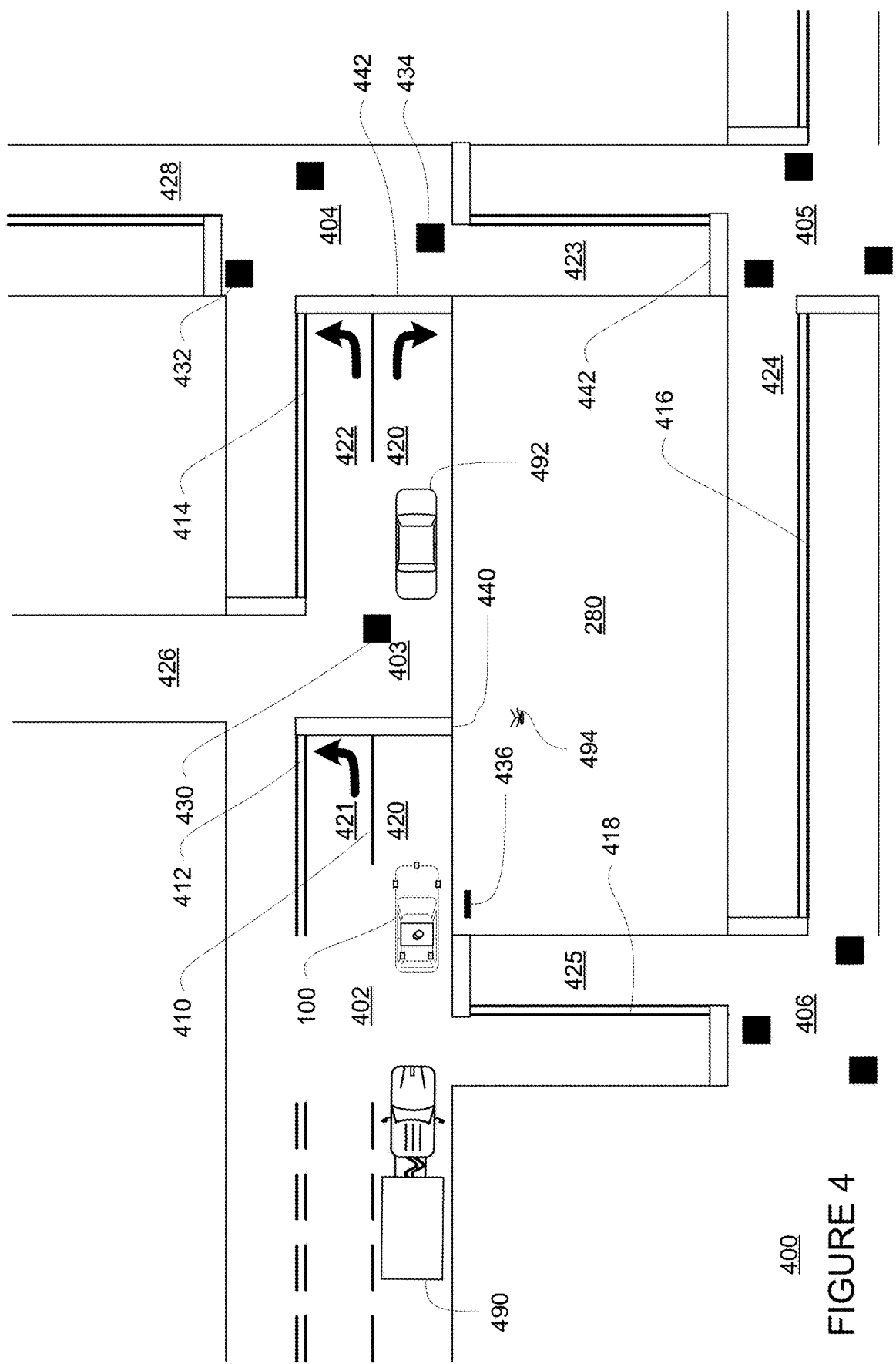
FIG. 4 is an example of a geographic area, a vehicle, and detected objects in accordance with aspects of the disclosure.

For instance, as the vehicle 100 moves through its environment, the vehicle's perception system 174 may detect and identify objects in the vehicle's environment. FIG. 4 is an example of vehicle 100 driving through a geographic area 400 corresponding to the area of the map information 200 depicted in FIG. 2. In this example, the shape, location and other characteristics of intersections 402, 403, 404, 405, 406 correspond to intersections 202, 203, 204, 205, 206, the shape, location and other characteristics of lane lines 410, 412, 414, 416, 418 correspond to lane lines 210, 212, 214, 216, 218, the shape, location and other characteristics of lanes 420, 421, 422, 423, 424, 425, 426, 428 correspond to lanes 220, 221, 222, 223, 224, 225, 226, 228, the shape, location and other characteristics of traffic control devices including traffic signal lights 430, 432, 434 and stop sign 436 correspond to traffic signal lights 230, 232, 234 and stop sign 236, the shape, location and other characteristics of stop lines 440, 442, 444 correspond to stop lines 240, 242, 244, and the shape, location and other characteristics of area 480 correspond to non-drivable area 280. In this example, vehicle 100 is in lane 420 approaching intersection 403.

As noted above, the perception system 174 may determine characteristics for each object including location, type, heading, orientation, speed, acceleration, change in acceleration, size, shape, etc. This information may be "published," that is provided by the perceptions system to other systems of the vehicle 100, including the computing devices 110, planning system 168, and behavior modeling system 176. For example, the perception system 174 may detect and identify the features and characteristics of a plurality of objects including truck 490, car 492, and pedestrian 494.

Figure 5:
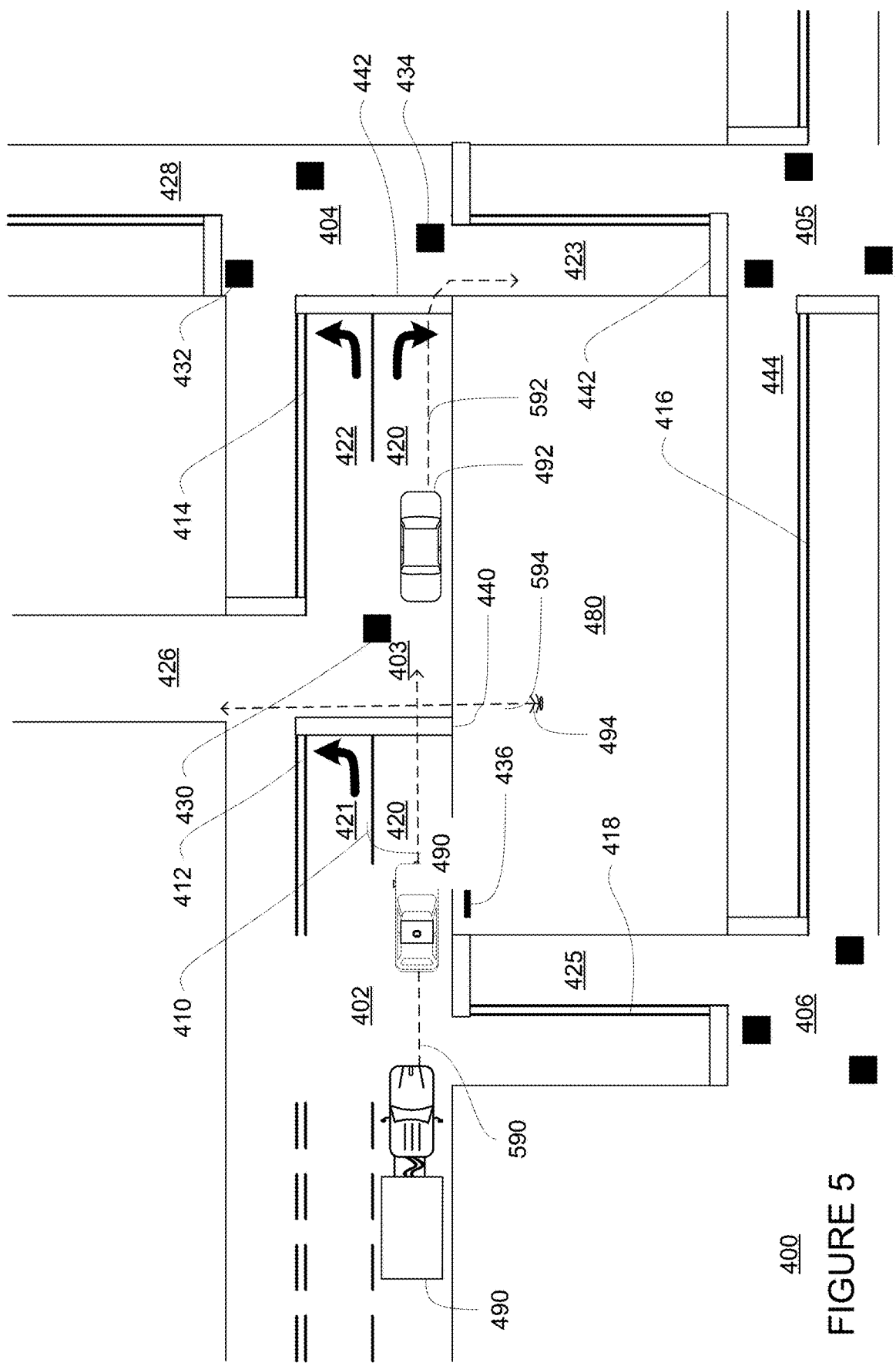
FIG. 5 is an example of a geographic area, a vehicle, detected objects, and predicted trajectories in accordance with aspects of the disclosure.

In some instances, such as for road user objects like pedestrians, bicyclists, motorcyclists, and vehicles, the published characteristics of these objects may be input into a behavior prediction system software module of a behavior modeling system 176. The behavior modeling system 176 may use various behavior models based on object type to output a predicted future behavior for a detected object. This predicted future behavior may include a predicted trajectory for the predicted object identifying a predicted location, heading, orientation, speed, acceleration, and change in acceleration at different points in time. In this regard, the behavior prediction mode may generate behavior predictions, or trajectories, for each of a plurality of objects including the road user objects truck 490, car 492, and pedestrian 494. Turning to FIG. 5, each of the truck 490, car 492, and pedestrian 494 is depicted with a predicted trajectory 590, 592, 594, respectively. This information may also be "published," that is provided by the behavior modeling system 176 to other systems of the vehicle 100, including the computing devices 110 and planning system 168. In this regard, the computing devices 110 and/or planning system 168 may receive the predicted trajectories 590, 592, 594 from the behavior modeling system 176.

Figure 6:
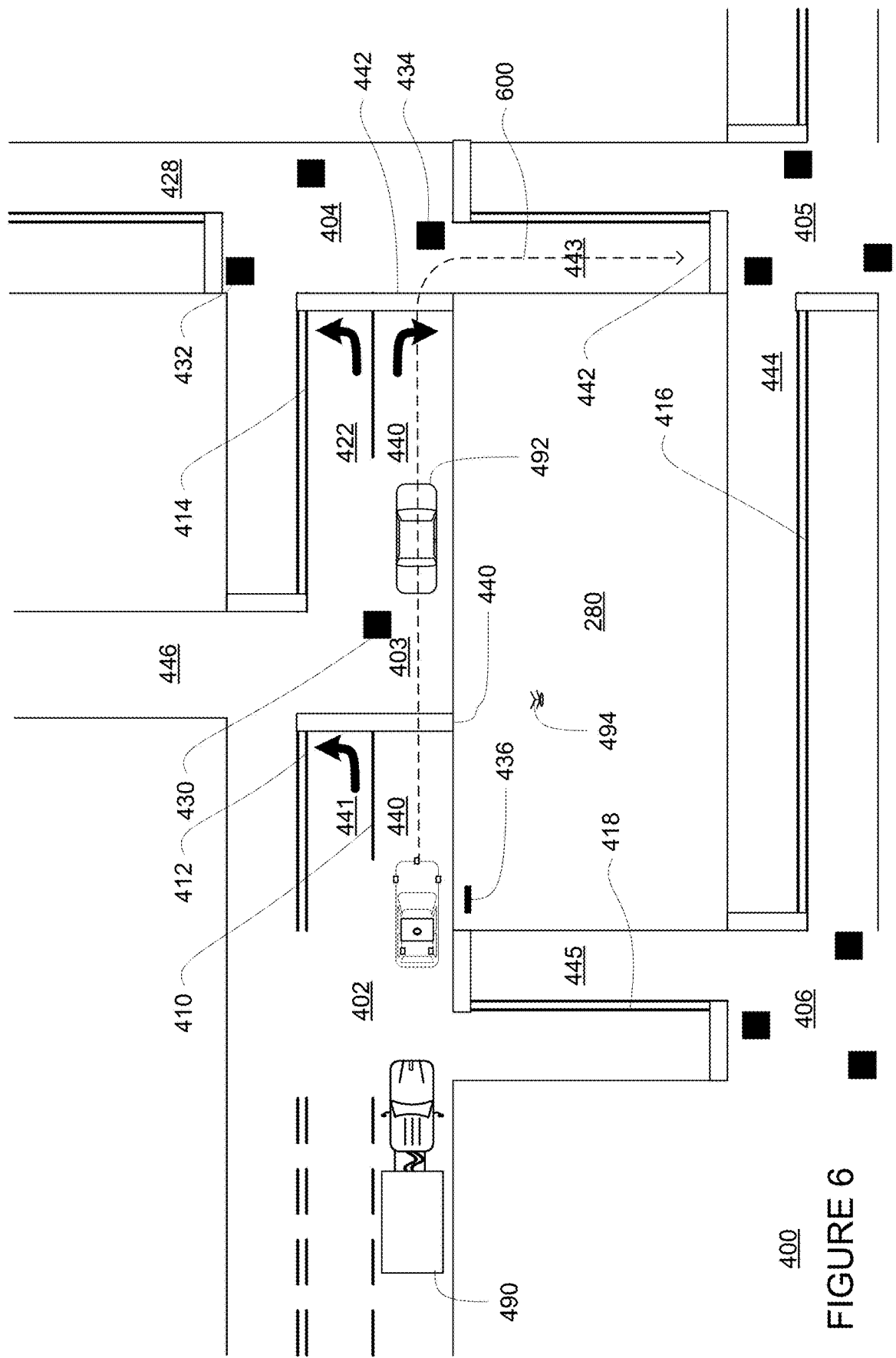
FIG. 6 is an example of a geographic area, a vehicle, detected objects, and a planned trajectory in accordance with aspects of the disclosure.

The planning system 168 may use information published by the perception system 174, routing system 170 (e.g. a route to a destination), the behavior modeling system 176 and other systems of the vehicle to generate planned trajectories for the vehicle to follow in order to follow the route to the destination as described above. In order to improve the safety of the vehicle 100, before "publishing" a planned trajectory to cause the vehicle to be controlled according to the planned trajectory, the planned trajectory may be evaluated to ensure that it will not result in a collision. FIG. 6 depicts an example planned trajectory 600 for the vehicle 100 where the vehicle proceeds through the intersection 403 and stops at the intersection 404 before making a right turn into lane 423 and proceeding towards intersection 405. As an example, before being acted upon or rather, before using the planned trajectory to control the vehicle as described above, the planned trajectory 600 may be evaluated to ensure that it will not result in a collision, for example, with any of the objects detected by the perception system 174, including truck 490, car 492, and pedestrian 494.

Figure 7:
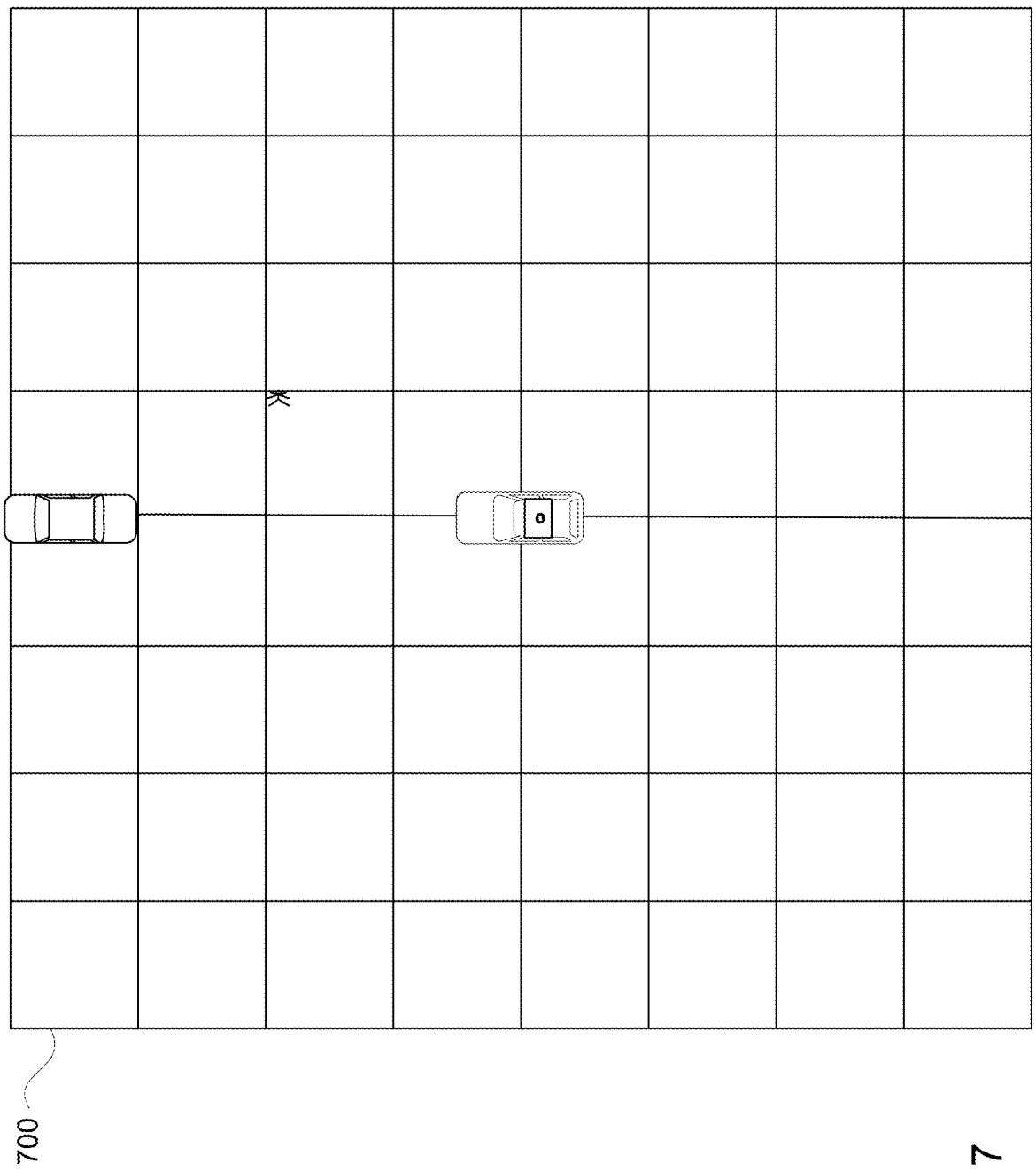
FIG. 7 is an example grid in accordance with an aspect of the disclosure.
Figure 8:
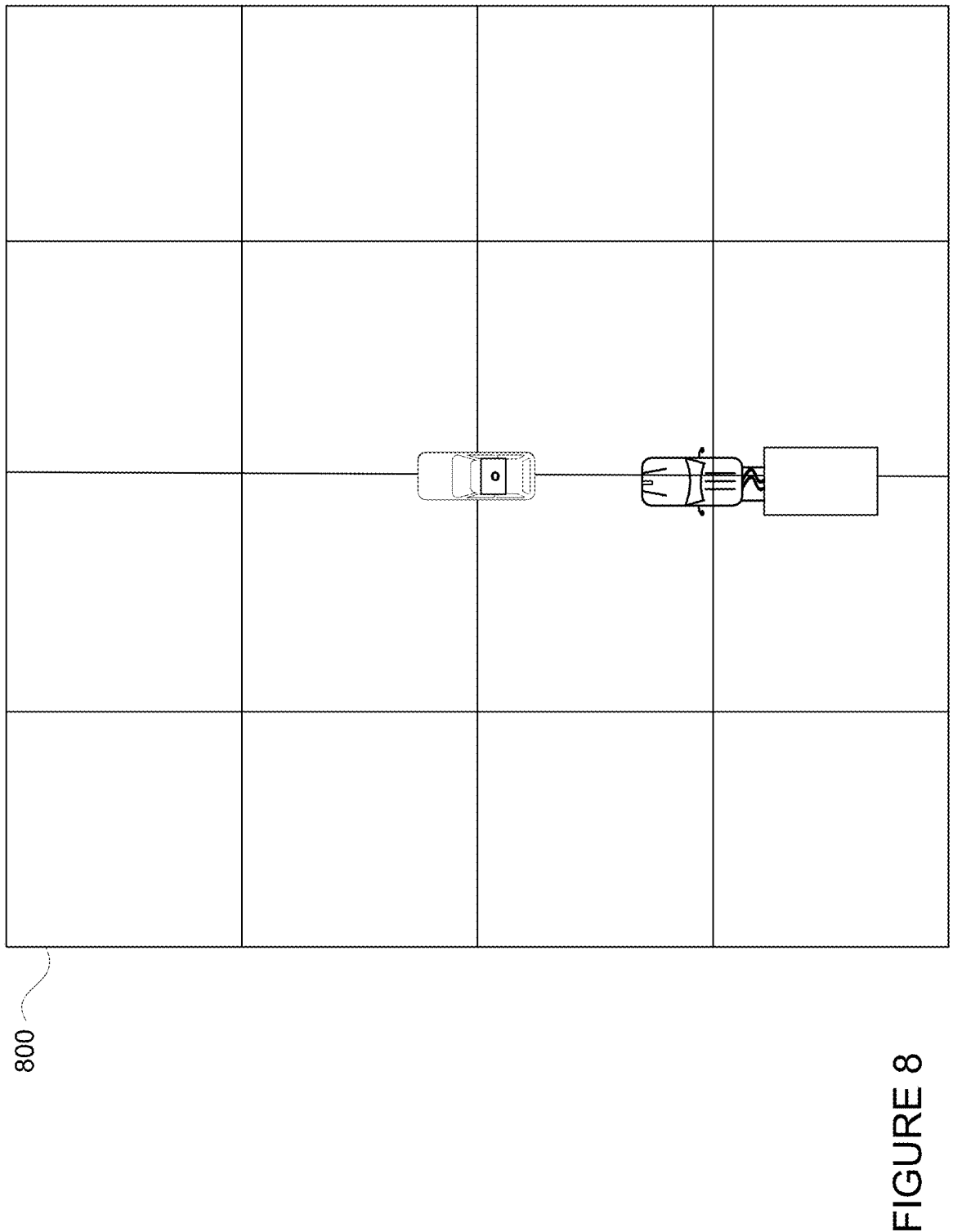
FIG. 8 is an example grid in accordance with an aspect of the disclosure.

Returning to FIG. 11, at block 1120, a set of one or more grids may be generated. Each grid of the set includes a plurality of cells, and the size of each cell for a given grid of the set of one or more grids is determined based on the size of any objects associated with the given grid. In order to perform the collision evaluation for a planned trajectory, a set of grids may be generated for each trajectory. In this regard, each object associated with a grid of the set of grids may be stored for collision evaluation. For instance, returning to the example of FIG. 4, the perception system 174 may detect and identify road users including truck 490, car 492, and pedestrian 494. Thus, a set of grids may include one or more grids for the truck 490, car 492, and pedestrian 494. FIGS. 7 and 8 are examples of grids 700 and 800 for the car 492 and the pedestrian 494 as well as the truck 490, respectively.

Each grid of the set may be centered around a current location of the vehicle 100 which may correspond to a point in time at the beginning of the planned trajectory. As shown in FIGS. 7 and 8 each of the grids 700 and 900 is centered around the location of the vehicle 100. The size or overall dimensions of the grids may be determined based on how far the vehicle is likely to travel during the planned trajectory with some additional buffer area. In this regard, if each planned trajectory spans approximately 9-10 seconds, the grid may be a square of 500 meters, 1000 meters, or more or less. Rectangles and other shapes may also be used.

The dimensions of the grids may be fixed or may increase or decrease depending upon the current or future (e.g. a speed at some point along a planned trajectory) of the vehicle. Of course each grid in the set of grids may have the same overall dimensions and therefore cover the same geographic area around the current location of the vehicle. In that regard, objects that would be located outside or beyond the bounds of the grids may not be stored for collision evaluation.

While each grid in the set of grids may have the same overall dimensions, the dimensions or size of the cells of each grid of the set may be dependent upon the size of the vehicle as well as the size of any objects associated with that grid. In this regard, while the cells of different grids in the set may differ, all cells within the same grid may be the same size. The smallest cell size permitted for the cells of any grid may be selected such that at any location in the grid, the vehicle 100 can occupy no more than a predetermined number of cells such as 4 cells or more or less at any given point in time. In addition, the smallest cell size permitted for the cells of any grid may also be large enough to allow the entire vehicle to fit into a single cell. For example, the size of the cells of each of grids 700 and 800 are large enough to fit the vehicle 100.

As noted above, the size of the cells for each grid of the set may also be dependent upon the objects associated with that grid. Of course, objects detected by the perception system will vary in size. As an example, the size of truck 490 could be tens of times bigger than the size of pedestrian 494. If only a single grid with a single grid cell size was used, the result would either have one object occupying many small cells, or many small objects allocated to a large cell. Either way may be inefficient. To address this, different grids may be built using different cell sizes for different objects. For instance, for a grid associated with a large object, the size of cells around that object may be increased exponentially (e.g. the length and width of each cell may increased by a factor of 2 such that the area may be increased by a factor of 4 each time) until that object fit into a single cell and occupies no more than the predetermined number cells, here 4 cells. For example, the cells of grid 700 are large enough to fit the car 492 and the pedestrian 494 each into a single cell and no more than 4 cells of grid 700, whereas the truck 490 cannot fit into a single cell of grid 700. In this regard, another grid would need to be generated for the truck 490. Turning to FIG. 8, the cells of grid 800 are large enough to fit the truck 490 into a single cell and no more than 4 cells. In other words, the cells of grid 700 were increased to the size of grid 800 wherein the truck 490 is able to fit into a single cell and no more than 4 cells.

For even faster processing, the cell sizes may be predetermined organized by grid levels. For example, a grid at level 0 may have the smallest cells (depicted in FIG. 7), a grid at level 1 may have cells that are 4 times larger than a grid at level 0 (depicted in FIG. 8), and so on. Because the overall dimensions of the grid may be fixed, as the cell size increases exponentially (e.g. the area may be increased by a factor 4 each time), the number of cells in the grid will also decreases exponentially (e.g. the area may be decreased by a factor of 4 each time). Therefore, the total number of cells in the grids is limited by the size of those cells.

In the event that there were no objects that would fit into a particular grid (e.g. because the cells are too small), the set of grids would not include that grid. In this regard, if there were no pedestrian 494 or car 492, the set of grids for the example of FIG. 6 would not need to include the grid 700. In this regard, the set of grids may only include a single grid.

Figure 9:
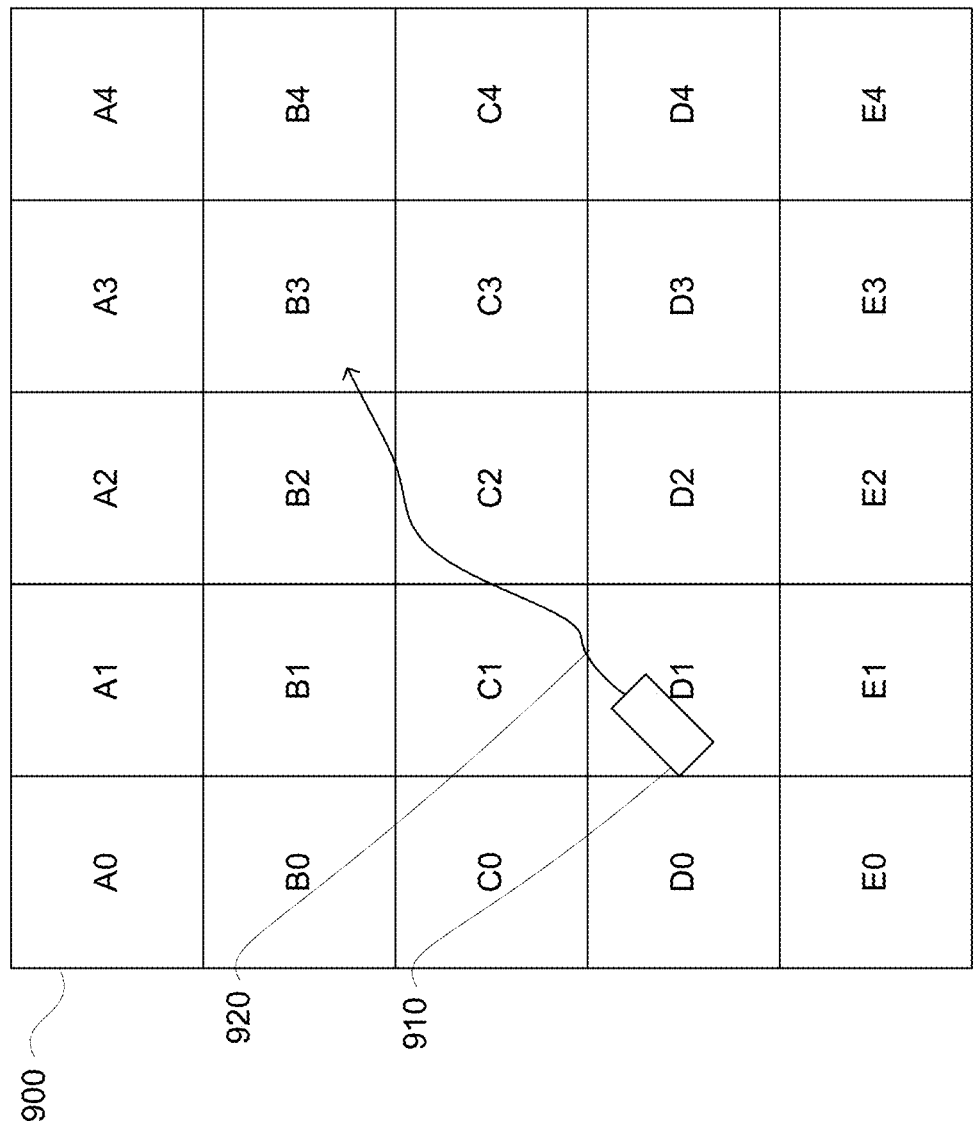
FIG. 9 is an example grid in accordance with an aspect of the disclosure.

Returning to FIG. 11, at block 1130, occupancy of each grid of the set of grids is determined based on the predicted trajectories. Once each grid of the set generated for each object, the predicted trajectory for the object associated with that grid may be stored within the grid and indexed by time. For each object, its predicted trajectory can be segmented based on the cells of the grid that the predicted trajectory will visit. FIG. 9 provides a simplified example of a grid 900 including cells A0-E5. In this example, a detected object 910 is displayed at a current location in cell D1 and with a predicted trajectory 920 for the detected object 910 passing through cells C1, C2, B2, and B3.

Returning to FIG. 11, at block 1140, a cell of each grid of the set of grids which will be occupied by the vehicle at a location and time of the planned trajectory is identified. For example, as with predicted trajectories, the planned trajectory for the vehicle can be segmented based on the cells of the grid that the planned trajectory will visit. By doing so, the cells which are occupied by the vehicle during the course of the planned trajectory may be identified.

At block 1150, the planned trajectory is evaluated based on whether any identified cell is occupied by any of the plurality of objects at the time. For instance, each grid of the set can then be evaluated to determine whether there might be a collision at different locations and corresponding times along a planned trajectory generated by the vehicle's planning system. For instance, given a vehicle's current or future position and time along a planned trajectory, a cell of each grid may be located that contain the vehicle's center. As described above, objects could also occupy at most four neighboring cells in any grid, and the size of the smallest cell is larger than the size of the vehicle, so the vehicle can at most occupy four cells in any grid. Therefore, the evaluation may involve checking for objects in the nine cells centered around the cell that contains the vehicle. To increase efficiency of the checking, the evaluation may involve simply determining whether any of the nine cells is occupied by an object.

This process may be repeated for all grids of the set of grids and at different times for the planned trajectory. If the evaluation of any cell identifies that it is occupied by one or more objects, the evaluation may result in a "collision" for the planned trajectory. If no collisions are found, the planned trajectory may be used to control the vehicle in an autonomous driving mode as described above. If a collision is found, the planning system 168 may discard the planned trajectory and attempt to generate a new planned trajectory and the process may repeat until a new planned trajectory without a collision is generated. This new planned trajectory may be used to control the vehicle as described above.

Alternatively, if a collision is found, the planning system 168 may generate a plurality of possible planned trajectories (for example, tens of thousands or more or less), and the evaluation can be used to filter or discard those planned trajectories that may result in a collision to identify which is "best". This identified planned trajectory may be used to control the vehicle as described above.

Figure 10:
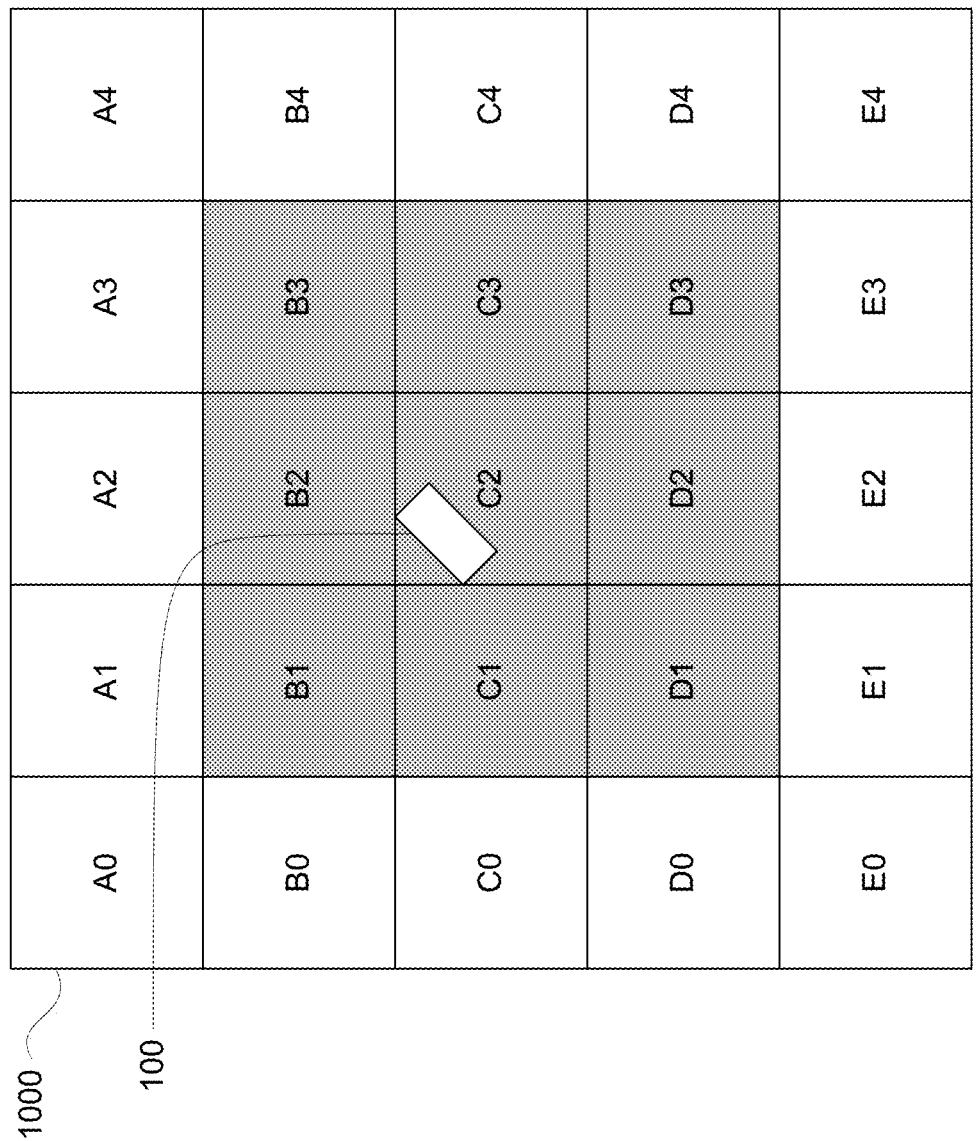
FIG. 10 is an example grid in accordance with an aspect of the disclosure.

However, the aforementioned evaluation may require checking each of the 9 cells individually for an object. Turning to the example of FIG. 10, if the vehicle 100 is in C2 of grid 1000, the evaluation would involve checking for a collision with the objects in C2, and all the objects in the 8 surrounding cells. This creates inefficient memory access, as the cells may be stored linearly in memory in the order [A0 . . . A4, B0 . . . B4 . . . E0 . . . E4]. To further improve efficiency, the object may be replicated in all neighboring cells. In this regard, in the above example, the object's occupancy of B1, B2, B3, C1, C3, D1, D2, D3 at different points in time would also be stored in C2. Similarly, the object's occupancy of B2, B3, B4, C2, C3, C4, D2, D3, D4 would also be stored in C3 and so on. Thus, when the center of the vehicle is located in C2, only the data stored within would need to be evaluated. As such, the evaluation would involve determining if any of the surrounding cells are occupied at a given point in time.

In situations in which the vehicle is formed from multiple sections which can move relative to one another, different sets of grids may be generated and used for collision evaluation for the different portions of the vehicle. In this regard, for a planned trajectory, a first set of grids may be generated and evaluated for the first portion of the vehicle as described above, and a second set of grids may be generated and evaluated as described above for a second portion of the vehicle. For example, a tractor trailer may include a first portion corresponding to the cab and a second portion corresponding to the trailer. As such a first set of grids centered around the current location of the cab may be generated for any objects located within the dimensions of the second set of grids, and a second set of grids centered around the current location of the tractor trailer may be generated for any objects located within the dimensions of the second set of grids. In other words, the different sets of grids may cover slightly different geographic areas and may therefore be associated with different objects. As in the examples described above for a single set of grids, the occupancy of each grid of the first and second sets may be determined based on the predicted trajectories for the objects associated with each of those grids, and the planned trajectory may be evaluated using the grids of the first and second sets to determine whether the planned trajectory may result in a collision with any of the object.

The collision evaluation described herein also allows for collision traceability. For example, because each object will be associated with its own grid and each grid is associated with only a single object, the evaluation will automatically identify the object that is likely to cause the collision. This information can be fed back into the planning system 168 in order to reduce the likelihood of the planning system generating a new planned trajectory that could cause a collision with the identified object.

The features described herein may allow for an efficient confirmation of planned trajectories for vehicles. In addition, the approach described herein may avoid computing geometry rasterization, quickly locate objects and predicted trajectories, adapt to objects of various sizes, reason about collision context, and easily add and remove objects and predicted trajectories. Moreover, the approach, and specifically using grids and duplicative storage, has shown itself to be significantly faster (up to five times) than other approaches which use more specific collision evaluations. Thus, in situations in which only a fraction of a second can be spared for such calculations, the approach described herein is incredibly valuable.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of controlling an autonomous vehicle, the method comprising:
    receiving, by one or more processors, a predicted trajectory for each of a plurality of objects in an environment of the vehicle;
    generating, by the one or more processors, a plurality of different sets of grids used for collision evaluation of respective sections of the vehicle, each grid of each set of grids including a plurality of cells;
    for each cell of each grid:

storing, by the one or more processors, occupancy data associated with the cell and cells adjacent to the cell at different points in time;

determining, by the one or more processors, occupancy of the grid based on the predicted trajectories;

identifying, by the one or more processors, a particular cell of the grid which will be occupied by the vehicle at a point in time identified by a first of a plurality of planned trajectories;

evaluating, by the one or more processors, the occupancy data associated with the particular cell to determine whether any of the adjacent cells would be occupied by any of the plurality of objects at the point in time identified by the first of the plurality of planned trajectories; and determining, by the one or more processors, whether to discard the first of the plurality of planned trajectories based on the evaluation of the occupancy data;

controlling, by the one or more processors, the vehicle in an autonomous driving mode according to the first of the plurality of planned trajectories when the one or more processors determine not to discard the first of the plurality of planned trajectories based on the evaluation of the occupancy data; and controlling, by the one or more processors, the vehicle in the autonomous driving mode according to a second one of the plurality of planned trajectories when the one or more processors determine to discard the first of the plurality of planned trajectories based on the evaluation of the occupancy data.

2. The method of claim 1, wherein a size of each cell of the grid is determined based on a size of any of the plurality of objects associated with the grid, and the size of each cell of the grid is determined further based on a size of the vehicle.

3. The method of claim 2, wherein determining the size of each cell of the grid includes increasing the size until an object of the plurality of objects will fit into a cell of the increased size.

4. The method of claim 3, wherein determining the size of each cell of the grid further includes increasing the size until the object can occupy no more than four cells of the increased size.

5. The method of claim 1, wherein each grid of the set of grids covers a same geographic area.

6. The method of claim 1, wherein generating each grid of the set of grids includes determining dimensions of each of the grids in the set of grids.

7. The method of claim 6, wherein the dimensions are a predetermined size.

8. The method of claim 1, wherein there are eight cells adjacent to the particular cell.

9. The method of claim 1, wherein the evaluation of the occupancy data indicates whether the first of the plurality of planned trajectories could cause a collision.

10. The method of claim 1, wherein the predicted trajectory for each of the plurality of objects is received by the one or more processors from a behavior modeling system or a planning system.

11. The method of claim 1, wherein each grid of the set of grids is centered around a current location of the vehicle.

12. The method of claim 1, wherein the respective sections of the vehicle can move relative to one another.

13. A system for controlling an autonomous vehicle, the system comprising one or more processors configured to:
receive a predicted trajectory for each of a plurality of objects in an environment of the vehicle;
generate a plurality of different sets of grids used for collision evaluation of respective sections of the vehicle, each grid of each set of grids including a plurality of cells;
for each cell of each grid:
store occupancy data associated with the cell and cells adjacent to the cell at different points in time;
determine occupancy of the grid based on the predicted trajectories;
identify a particular cell of the grid which will be occupied by the vehicle at a point in time identified by a first of a plurality of planned trajectories;
evaluate the occupancy data associated with the particular cell to determine whether any of the adjacent cells would be occupied by any of the plurality of objects at the point in time identified by the first of the plurality of planned trajectories; and
determine whether to discard the first of the plurality of planned trajectories based on the evaluation of the occupancy data;
control the vehicle in an autonomous driving mode according to the first of the plurality of planned trajectories when the one or more processors determine not to discard the first of the plurality of planned trajectories based on the evaluation of the occupancy data; and
control the vehicle in the autonomous driving mode according to a second one of the plurality of planned trajectories when the one or more processors determine to discard the first of the plurality of planned trajectories based on the evaluation of the occupancy data.

14. The system of claim 13, wherein each grid of the set of grids is centered around a current location of the vehicle.

15. The system of claim 13, wherein a size of each cell of the grid is determined based on a size of any of the plurality of objects associated with the grid, and the one or more processors are further configured to determine the size of each cell of the grid further based on a size of the vehicle.

16. The system of claim 15, wherein the size of each cell of the grid is further determined by increasing the size until an object of the plurality of objects can occupy no more than four cells of the increased size.

17. The system of claim 13, wherein there are eight cells adjacent to the particular cell.

18. The system of claim 13, wherein the evaluation of the occupancy data indicates whether the first of the plurality of planned trajectories could cause a collision.

19. The system of claim 13, wherein the predicted trajectory for each of the plurality of objects is received by the one or more processors from a behavior modeling system or a planning system.

20. The system of claim 13, wherein the respective sections of the vehicle can move relative to one another.

* * * * *

UNITED STATES PATENT AND TRADEMARK OFFICE
CERTIFICATE OF CORRECTION

PATENT NO. : 12,037,017 B2
APPLICATION NO. : 17/071008
DATED : July 16, 2024
INVENTOR(S) : Dong Li et al.

Page 1 of 1

It is certified that error appears in the above-identified patent and that said Letters Patent is hereby corrected as shown below:

In the Claims

Claim 3, Column 15, Line 37:
Now reads: "each cell of the grid"; should read -- each cell of each grid --

Claim 4, Column 15, Line 41:
Now reads: "each cell of the grid"; should read -- each cell of each grid --

Claim 5, Column 15, Line 44:
Now reads: "the set"; should read -- each set --

Claim 6, Column 15, Line 47:
Now reads: "the set"; should read -- each set --

Claim 11, Column 15, Line 60:
Now reads: "the set"; should read -- each set --

Claim 14, Column 16, Line 39:
Now reads: "the set"; should read -- each set --

Signed and Sealed this
Eighteenth Day of February, 2025

Coke Morgan Stewart
*Acting Director of the United States Patent and Trademark Office*